United States Patent [19]

Twigg

[11] Patent Number: 5,728,275
[45] Date of Patent: Mar. 17, 1998

[54] SACRIFICIAL ANODE AND METHOD OF MAKING SAME

[75] Inventor: Richard Twigg, Muskogee, Okla.

[73] Assignee: Alumax Extrusions, Inc., Cressona, Pa.

[21] Appl. No.: 713,564

[22] Filed: Sep. 13, 1996

[51] Int. Cl.[6] .................................................. C25B 11/00
[52] U.S. Cl. ........................... 204/286; 204/292; 204/293; 204/280; 420/548
[58] Field of Search ........................... 204/196, 197, 204/404, 280, 286, 292, 293; 420/541, 542, 528, 402, 407, 411, 548, 554

[56] References Cited

U.S. PATENT DOCUMENTS

| | | | |
|---|---|---|---|
| 3,186,836 | 6/1965 | Pryor et al. | 75/138 |
| 3,240,688 | 3/1966 | Pryor et al. | 204/148 |
| 3,337,333 | 8/1967 | Reding et al. | 75/138 |
| 3,368,952 | 2/1968 | Pryor et al. | 204/148 |
| 3,393,138 | 7/1968 | Hine et al. | 204/148 |
| 3,878,081 | 4/1975 | Reding et al. | 204/197 |
| 3,978,309 | 8/1976 | Strobach et al. | 219/104 |
| 4,035,903 | 7/1977 | Taggart | 29/458 |
| 4,051,007 | 9/1977 | Hössle | 204/197 |
| 4,098,606 | 7/1978 | Despic et al. | 75/138 |
| 4,554,131 | 11/1985 | Thompson et al. | 420/546 |
| 4,786,383 | 11/1988 | Houle | 204/148 |
| 4,792,430 | 12/1988 | Horst | 420/548 |
| 4,808,498 | 2/1989 | Tarcy et al. | 204/197 |
| 4,910,865 | 3/1990 | Houle | 29/825 |
| 4,950,560 | 8/1990 | Tarcy | 420/554 |

*Primary Examiner*—Bruce F. Bell
*Attorney, Agent, or Firm*—Panitch Schwarze Jacobs & Nadel, P.C.

[57] ABSTRACT

A sacrificial anode and method of making a sacrificial anode are provided. The anode includes an extruded galvanically active metal rod and integrally formed end cap which has a cylindrically shaped portion with a threaded exterior surface. The anode is formed by extruding the rod, forging the end cap from the anchoring end portion of the rod, and machining the outer surface of the end cap to provide threads.

11 Claims, 2 Drawing Sheets

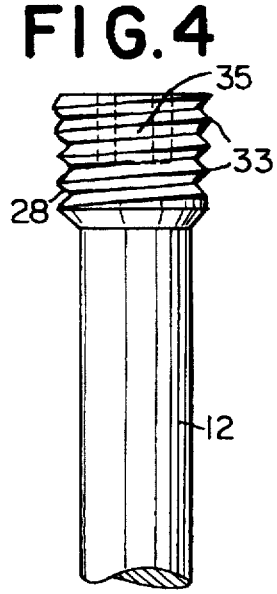
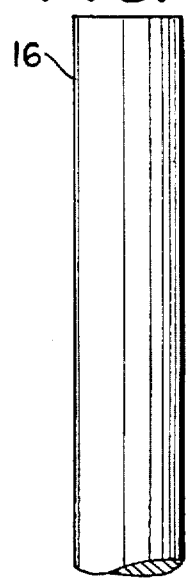
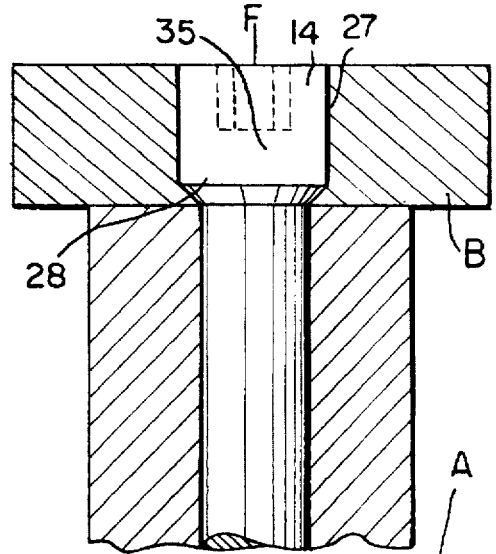
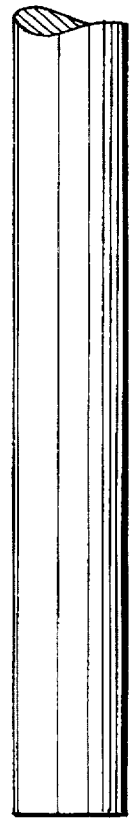
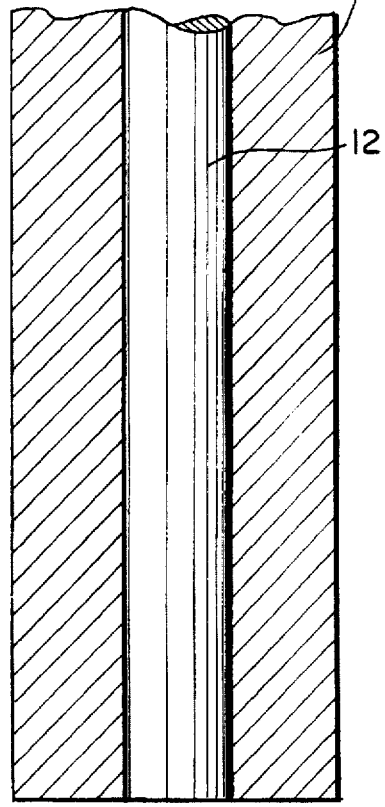

5,728,275

SACRIFICIAL ANODE AND METHOD OF MAKING SAME

FIELD OF THE INVENTION

The present invention relates to sacrificial anodes, particularly for use in hot water heaters, water tanks and other corrosive facilities.

BACKGROUND OF THE INVENTION

Sacrificial anodes are used in various metal structures, for example, hot water heater tanks and water tanks, in order to prevent corrosion of the tank. Metal surfaces, particularly those of ferrous materials, when exposed to air and water, undergo oxidation or corrosion. While metal surfaces may be coated, for example, with zinc, or glass-lined, such coatings and linings are subject to imperfections or breakage and are expensive. As such, many manufacturers use sacrificial anodes of galvanically active metals, such as zinc, aluminum or magnesium, instead of such coatings and linings, or in addition to them as extra protection against corrosion.

The anode is depleted during its operational life to provide cathodic protection to the surrounding metal structure (i.e., the inside of the tank). These anodes are generally cylindrically shaped rods of uniform diameter and are extruded or cast around a core wire or rod of another conductive metal, typically a ferrous metal such as steel. The consumption of most prior art anodes is generally uneven, which is the primary purpose of the steel rod. By extruding the aluminum anode around the steel rod, if the anode is consumed unevenly, the rod will be able to retain the remaining pieces of the anode attached to the rod so that large portions of the anode do not become disconnected from the primary rod structure. Further, the extrusion process leaves welds on the rod which create cathodic sites and an internal circuit between the cathodic weld lines and the anode. This internal circuit causes unnecessary dissolution of the anode.

The uneven, non-linear dissolution of some anodes, particularly in areas closest to the surfaces of the metal structure requiring protection, also causes the anodes to require untimely replacement due to thinning in these areas even though much of the remaining rod would be otherwise still useful.

In addition to uneven dissolution problems which can increase the costs of using anodes due to wasted galvanic metal, the cost of making the anodes is high due to the additional metal core wire which contributes to raw material costs and requires additional production steps.

Anode rods are generally disposed within a metal structure such as a tank and fastened to the metal structure to provide a mechanical and electrical contact between the anode and the structure. The anode rod is typically threaded into, or otherwise sealed to, the core of a separate head which may be threaded to receive the rod. The head may then be threaded on its exterior to fit into a coupling or spud on the wall of the structure. Heads have been attached to anode rods by various means including mechanical threading, adhesive bonding, crimping and riveting.

Many separately manufactured heads are not machined exactly or properly affixed to the rod such that there is not always an adequate seal in the area of connection between the rod and the head or between the head and the coupling on the metal structure. This lack of fit or loss of seal may cause loss of electrical contact rendering the entire anode ineffective.

As such, there is a need in the art for an improved sacrificial anode which is inexpensive to manufacture, which dissolves evenly and which provides sufficient anode material and good sealing in the area of connection of the rod to the head or other connection on a metal structure to be protected. There is further a need in the art for an anode having a longer life as a result of reducing the rate of dissolution by eliminating weld lines which contribute to internal circuit dissolution.

SUMMARY OF THE INVENTION

The present invention provides a sacrificial anode for preventing corrosion to a metal surface which comprises an extruded rod having an anchoring end portion terminating in an end surface. The rod comprises a galvanically active metal. The anode also comprises an end cap which is integrally formed from the galvanically active metal of the anchoring end portion of the rod. The end cap has a generally cylindrical portion which has a threaded exterior surface.

In one embodiment, the invention provides an extruded sacrificial anode having a solid transverse cross section for preventing corrosion to a metal surface. The anode comprises an aluminum alloy which comprises from 0.00 to about 0.15% by weight iron, from 0.00 to about 0.15% by weight silicon, from about 0.010 to about 0.025% by weight gallium, from about 0.120 to about 0.210% by weight tin, from about 0.08 to about 0.18% by weight bismuth, and no greater than about 0.10% by weight impurities, with the balance being aluminum.

The invention also provides a method of making a sacrificial anode which comprises extruding a galvanically active metal to form a rod having an anchoring end portion, forging an end cap which has a generally cylindrical portion from the anchoring end portion of the rod, and machining threads on the generally cylindrical portion of the end cap.

BRIEF DESCRIPTION OF THE DRAWINGS

The following description of the preferred embodiment of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings, like numerals are used to indicate like elements throughout. In the drawings:

FIG. 4 is a plan view, partially broken, for an alternative embodiment of a sacrificial anode having an internal hex head according to the present invention;

FIG. 6A is a plan view of an extruded anode rod, partially broken, formed according to one embodiment of the method of the present invention; and FIG. 6B is a plan view, partially in section and partially broken, of an anode rod of FIG. 6A having an end cap forged from the end of the anode rod according to the method of the present invention.

DETAILED DESCRIPTION OF PREFERRED EMBODIMENTS

Figure 1:
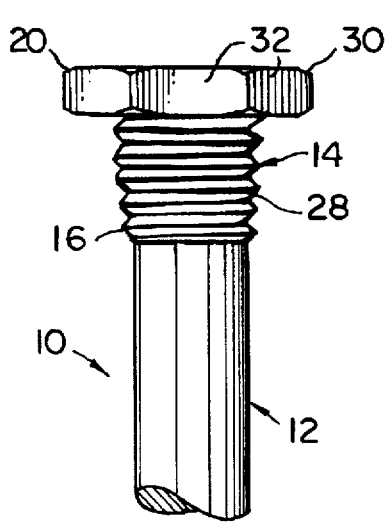
FIG. 1 is a plan view, partially broken, of one embodiment of a sacrificial anode according to one embodiment of the present invention.

Certain terminology is used in the following description for convenience only and is not limiting. The words "right," "left," "lower," "upper," "downward" and "outward" designate directions in the drawings to which reference is made. The terminology includes the words above specifically mentioned, derivatives thereof, and words of similar import.

Figure 2:
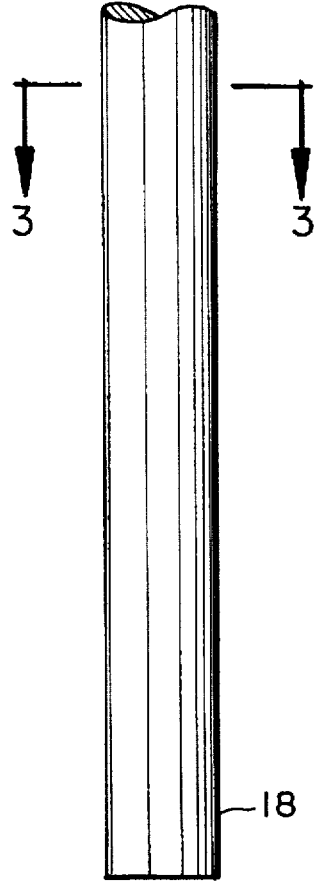
FIG. 2 is a top elevational view of the hex head of the sacrificial anode of FIG. 1.
Figure 2:
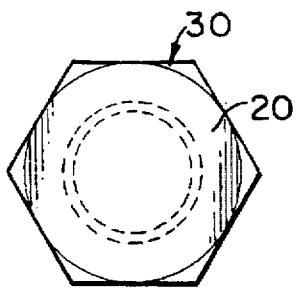

Referring now to the drawings in detail, there is shown in FIG. 1 a sacrificial anode, generally designated as 10, having a rod 12 and an end cap 14 according to one embodiment of the present invention. The rod extends longitudinally between an anchoring end portion 16 for connecting to the metal surface of a metal structure to be protected against corrosion and an opposite end portion 18. The anchoring end portion terminates in an end surface 20 as shown in FIGS. 1 and 2.

Figure 5:
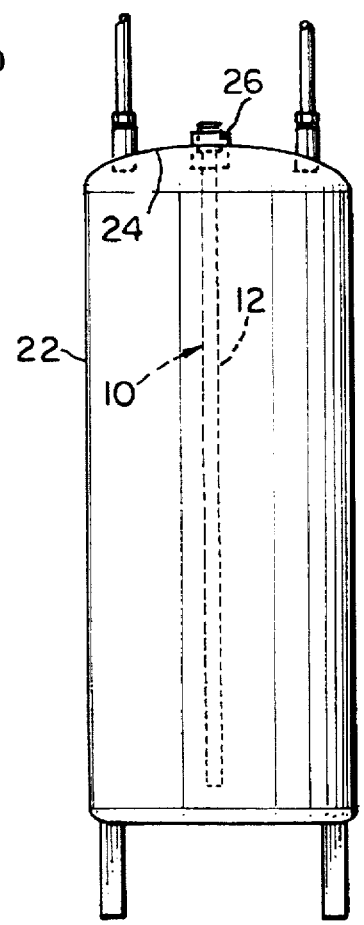
FIG. 5 is a diagrammatic representation of a sacrificial anode according to the present invention as installed in a hot water heater.

The rod is formed of a galvanically active metal which is electro-positive with respect to the metal surface to be protected. The metal surface to be protected is generally a ferrous-type surface, such as steel, for use, for example, in tanks subject to corrosion. One metal structure which may be protected from corrosion by the anode 10 is a water heater tank 22 having the steel surface 24 as shown in FIG. 5. The rod is mechanically and electrically in contact with the metal surface to be protected, typically through a coupling such as coupling 26 in FIG. 5, thereby forming a galvanic circuit. Due to the presence of the anode rod, the metal surface is more electro-negative and the anode rod selectively dissolves in the presence of the corrosive environment. The anode rod thereby provides cathodic protection to the metal surface.

While the anode rod may be formed of any metal more electropositive than the metal surface to be protected, it is preferred that the anode rod be formed of a galvanically active metal. Exemplary metals include zinc, aluminum, magnesium and their alloys. Preferably, the anode rod is formed from an aluminum alloy.

Figure 3:
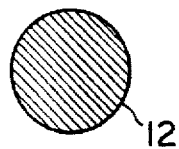
FIG. 3 is cross-sectional view of the anode of FIG. 1 taken along line 3—3.

As the anode rod is preferably formed without a steel core wire or other central rod, such that the transverse cross section of the rod is preferably solid as shown in FIG. 3, the anode rod is preferably formed of an alloy which dissolves substantially uniformly to prevent anode breakage. Preferably the aluminum alloy used to provide a substantially uniformly dissolving anode rod is an aluminum alloy which includes minor amounts of gallium or a similar metal in amounts of from about 0.010 to about 0.025% by weight, more preferably from about 0.015 to about 0.020% by weight. The preferred aluminum alloy also includes from about 0.120 to about 0.210% by weight, more preferably from about 0.130 to about 0.200% by weight tin, and from about 0.08 to about 0.18%, and more preferably from about 0.10 to about 0.15% by weight bismuth. The aluminum alloy may optionally include from 0.00 to about 0.15% by weight iron, from 0.00 to about 0.15% by weight silicon, and preferably from about 0.00 to about 0.10% by weight of either iron or silicon. The alloy preferably contains no greater than about 0.03% by weight for any particular impurity with preferred maximum of 0.10% by weight of total impurities. The balance of the alloy is preferably aluminum. By using gallium in the alloy, the alloy becomes self-sloughing and deteriorates uniformly thereby eliminating the need for the steel reinforcing wire.

The rod may be formed by hot working the alloy according to any suitable process such as forging, rolling and the like, but the rod is preferably formed by extrusion. The hot working should be optimized to produce a smooth surface on the anode with sufficient solutioning of the alloy to afford maximum electro-chemical output and efficiency. Preferably, the alloy is extruded at temperatures of from about 650° F. to about 850° F., more preferably, from about 700° F. to about 800° F. The finished rod is then cooled in ambient air.

The rod as extruded can have a variety of lengths ranging from about 9½" to about 54". The preferred length of the rod, for use as a sacrificial anode in hot water heaters should be the length of the tank with about a 1½" to about a 2" offset from the tank bottom. The rod is preferably cylindrical in cross section although other shapes such as oval, elliptical, square, triangular and the like are possible. As shown in FIG. 3, a cylindrically shaped rod as extruded has a diameter typically from about 0.605" to about 0.625".

While prior art end caps are typically formed separately and connected to the anode rod by various types of mechanical and electrical connections and seals, the sacrificial anodes of the present invention have an integral end cap. As no steel core wire or other reinforcing wire is used to support the anode rod during extrusion, the anchoring end portion 16 of the rod 12 is forged directly into an end cap. Preferably, the end cap is cold forged from the end portion 16. The rod is placed in a vice A or other similar apparatus, preferably the rod is placed in a smooth surfaced retainer clamp, for preventing movement of the rod as shown in FIG. 6B. The anchoring end portion 16 of the rod is placed into a preformed steel mold B having a recess 27 which receives the rod. A force F is applied to the anchoring end of the rod to forge the anchoring end portion 16 into the shape of an end cap 14 having a cylindrical portion 28 and a head 35. Preferably, the cold forging process occurs at ambient temperature and takes only milliseconds to complete. More preferably, a multiple forging process is used requiring two strokes, a first pre-form stroke for formation of the cylindrical portion 28 and a second near-net shape stroke for forming the internal hex head shape.

The cylindrical portion 28 is preferably adapted for mating engagement with a coupling in a metal surface to be protected from corrosion, for example, for connecting the sacrificial anode rod to the tank, hot water heater or other metal structure having a metal surface requiring cathodic protection. Preferably, the surface is equipped with a coupling having a threaded interior configured for receiving the anode rod end cap. The cylindrical portion, once forged as shown in FIG. 6B, may then be machined to provide threads 33 to the exterior surface adapted for mating engagement with the coupling or other metal surface attachment as shown in FIG. 4. The threaded exterior connects directly to the coupling or metal surface and provides direct electrical current, without an intervening surface. This direct electrical connection reduces internal circuit resistance and provides for a more efficient anode overall.

Further, the use of aluminum as the major alloy provides a self-galling end cap in which the threads conform to the mating threads on the coupling forming an excellent seal between the anode and metal surface to be protected. The seal is sufficient to eliminate the need for a separate sealant and reduces the risk of leakage which could cause exterior corrosion.

Figure 4A:
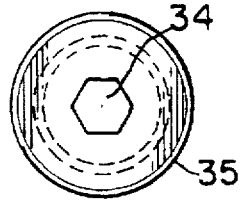
FIG. 4a is a top elevational view of the sacrificial anode of FIG. 4.

The head 30 of the end cap may have various configurations useful for tightening or removing the sacrificial anode from the mating coupling or surface attachment on the metal surface requiring cathodic protection. The head 30 may have a hexagonal cross section providing flat surfaces 32 for engaging a wrench or similar tool for turning the head 30 as shown in FIGS. 1 and 2. However, in the preferred embodiment, as shown in FIGS. 4 and 4a, to provide additional safety and to prevent accidental removal of the anode, a head 35 may be configured to have a circular cross section and an internal hex head having a hexagonally shaped recess 34 extending longitudinally into the head and configured for receiving an allen wrench or similar tool. Such a head 35 helps to render the anode tamper-proof.

The sacrificial anodes of the present invention, by providing an integrally formed end cap which is made of the same galvanically active metal as the anode rod and by eliminating the steel reinforcing wire present in prior art anodes, have a greater amount of available galvanic metal such as aluminum overall, and particularly near the metal surface. Further, the availability of more aluminum provides greater reactivity and a longer life than most prior art anodes while still providing equivalent or better performance in ampere-hours/lb. Low production costs are incurred in manufacturing the present sacrificial anodes due to the absence of the steel reinforcing wire. Further, by forging the end cap directly from the extruded rod, the anodes are very easy to manufacture, because there is no need for separate end cap forming and attachment steps required in forming prior art anodes. The extruded rods, which have no core wire, contribute to extending useful anode life by eliminating unnecessary dissolution caused by extrusion welds formed on prior art anodes which create cathodic sites and an internal circuit.

The method of forming a sacrificial anode for preventing corrosion to a metal surface according to a preferred embodiment of the present invention includes extruding a galvanically active metal to form a rod having an end surface as shown in FIG. 6A and a preferably solid transverse cross section. The rod also preferably has no core wire or other central reinforcing wire. The metal may be any of those mentioned above with respect to the anode 10 of the present invention. The rod may be extruded under conditions and into shapes as described above. Preferably, the rod is extruded into a cylindrical shape as shown and cooled as described above.

After the rod is formed, the end cap is forged, and preferably cold forged, from the first end portion of the rod as shown in FIG. 6B and in accordance with the above-description of the end caps for the anode 10. After forming the end cap on the first end, the end cap is machined to have a threaded exterior surface as shown in FIG. 4.

The invention will now be described in accordance with the following non-limiting example:

EXAMPLE I

An aluminum alloy having the composition as shown in Table I below was formed and extruded at a temperature of 800° F. into a cylindrical rod having a diameter of 0.614 in. and a length of 54 in.

TABLE I

| Alloy Element | Weight Percent |
|---|---|
| Iron | 0.06 |
| Silicon | 0.07 |
| Gallium | 0.018 |
| Tin | 0.014 |
| Bismuth | 0.012 |
| Impurities | ≦0.03 each |
| Aluminum | Balance |

The rod had a solid transverse cross section and was extruded without a core wire.

The extruded rod was placed in a smooth surfaced retainer clamp and a force of 250 tons$_f$ was applied to an anchoring end of the rod, including approximately 2 in. in length as measured from the end surface of the rod, which was inserted in a pre-formed mold. The force was applied by a horizontal mechanical closed die forge, and the anchoring end was formed into an end cap having a cylindrical portion approximately 1 in. long and an internal hex head. The internal recess of the hex head was approximately ⅜ in. in diameter and ⅝ in. deep.

The cylindrical portion of the end cap was machined by a CNC Threading Machine to form ¾ in. NPT threads.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A sacrificial anode for preventing corrosion to a metal surface, comprising:
   (a) an extruded rod having an anchoring end portion terminating in an end surface and comprising a galvanically active metal; and
   (b) an end cap integrally formed from the galvanically active metal of the anchoring end portion of the rod, the end cap comprising a generally cylindrical portion having a threaded exterior surface.

2. The sacrificial anode of claim 1, wherein the extruded rod has a solid transverse cross section, and has no core wire.

3. The sacrificial anode of claim 1, wherein the cylindrical portion of the end cap is adapted for mating engagement with a coupling in a metal surface.

4. The sacrificial anode of claim 1, wherein the galvanically active metal is selected from the group consisting of aluminum, zinc, magnesium, and alloys thereof.

5. The sacrificial anode of claim 4, wherein the galvanically active metal is an aluminum alloy.

6. The sacrificial anode of claim 5, wherein the aluminum alloy comprises from 0.00 to about 0.15% by weight iron, from 0.00 to about 0.15% by weight silicon, from about 0.010 to about 0.025% by weight gallium, from about 0.120 to about 0.210% by weight tin, from about 0.08 to about 0.18% by weight bismuth, and no greater than about 0.108 by weight impurities, wherein a balance of the alloy is aluminum.

7. The sacrificial anode of claim 1, wherein a hexagonally shaped head extends radially from the cylindrical portion at the end surface of the rod.

8. The sacrificial anode of claim 1, wherein the end surface is circular and further comprises a hexagonally shaped recess extending longitudinally into the head from the first end of the rod.

9. An extruded sacrificial anode, having a solid transverse cross section and no core wire, for preventing corrosion to a metal surface, comprising an aluminum alloy, wherein the alloy comprises from 0.00 to about 0.15% by weight iron, from 0.00 to about 0.15% by weight silicon, from about 0.010 to about 0.025% by weight gallium, from about 0.120 to about 0.210% by weight tin, from about 0.08 to about 0–18% by weight bismuth, and no greater than about 0.10% by weight impurities, wherein a balance of the alloy is aluminum.

10. A sacrificial aluminum anode for preventing corrosion to a metal surface, comprising:

(a) an extruded rod having an anchoring end portion terminating in an end surface and comprising an aluminum alloy; and (b) an end cap integrally formed from the aluminum alloy of the anchoring end portion of the rod, the end cap comprising a generally cylindrical portion having a threaded exterior surface.

11. The sacrificial aluminum anode of claim 10, wherein the extruded rod has a solid transverse cross section and no core wire.

* * * * *

UNITED STATES PATENT AND TRADEMARK OFFICE
CERTIFICATE OF CORRECTION

PATENT NO. : 5,728,275
DATED : March 17, 1998
INVENTOR(S) : Richard Twigg

It is certified that error appears in the above-indentified patent and that said Letters Patent is hereby corrected as shown below:

Column 6, Table 1, on same line as "Tin," "0.014" should read --0.14--; and on same line as "Bismuth," "0.012" should read --0.12--.

Signed and Sealed this

Ninth Day of June, 1998

BRUCE LEHMAN

*Attest:*

*Attesting Officer*         *Commissioner of Patents and Trademarks*